(12) United States Patent
Akahori et al.

(10) Patent No.: US 6,221,274 B1
(45) Date of Patent: Apr. 24, 2001

(54) LUBRICANT COMPOSITIONS FOR REFRIGERATING MACHINE EMPLOYING HFC-32, HFC-125 OR HFC-134A

(75) Inventors: Yasushi Akahori; Noboru Masuda; Takeshi Izawa, all of Tokyo; Masayoshi Muraki, Kanagawa; Kazuo Tagawa, Kanagawa; Tomohiro Magome, Kanagawa, all of (JP)

(73) Assignees: Mitsubishi Denki Kabushiki Kaisha; Nippon Mitsubishi Oil Corporation, both of Tokyo (JP)

( * ) Notice: Subject to any disclaimer, the term of this patent is extended or adjusted under 35 U.S.C. 154(b) by 0 days.

(21) Appl. No.: 09/233,199

(22) Filed: Jan. 20, 1999

(30) Foreign Application Priority Data

| Jan. 21, 1998 | (JP) | 10-023959 |
| Jan. 21, 1998 | (JP) | 10-023960 |
| Mar. 10, 1998 | (JP) | 10-076732 |

(51) Int. Cl.$^7$ .............. C10M 129/18; C09K 5/00
(52) U.S. Cl. .............. 252/68; 508/304; 508/438; 508/440
(58) Field of Search .............. 252/68; 508/433, 508/440, 304, 438

(56) References Cited

U.S. PATENT DOCUMENTS

| 3,483,122 | * 12/1969 | MacPhail et al. | 508/440 |
| 5,342,533 | 8/1994 | Kondo et al. | 252/68 |
| 5,653,909 | 8/1997 | Muraki et al. | 252/68 |
| 5,728,655 | * 3/1998 | Muraki et al. | 508/433 |

FOREIGN PATENT DOCUMENTS

| 0475 751 | 3/1992 | (EP) . |
| 0 653 479 | 5/1995 | (EP) . |
| 0 714 973 | 6/1996 | (EP) . |
| 8-157847 | 6/1996 | (JP) . |
| 8-259980 | 10/1996 | (JP) . |
| 9-67589 | 3/1997 | (JP) . |

OTHER PUBLICATIONS

Patent Abstracts of Japan, vol. 096, No. 012, Dec. 26, 1996, JP 08 209182, Aug. 13, 1996.
Patent Abstracts of Japan, vol. 098, No. 004, Mar. 31, 1988 JP 09 310086, Dec. 2, 1997.
Patent Abstracts of Japan, vol. 098, No. 003, Feb. 27, 1998, JP 09 302373, Nov. 25, 1997.

* cited by examiner

Primary Examiner—Margaret Medley
Assistant Examiner—Cephia D. Toomer
(74) Attorney, Agent, or Firm—Oblon, Spivak, McClelland, Maier & Neustadt, P.C.

(57) ABSTRACT

A lubricant composition for a refrigerating machine employing a HFC type refrigerant containing at least one selected from the group consisting of HFC-32, HFC-125 and HFC-134a, which comprises a base oil of an ester formed from a dihydric or higher polyol as an alcohol and a monobasic aliphatic acid, alone or as a mixture thereof; and additives of, based on the total amount, 1) not less than 0.01 vol % and less than 1.0 vol % of a phosphate, 2) from 0.01 to 1.0 vol % of at least one of an alkylphosphorothionate and an arylphosphorothionate and 3) from 0.01 to 1.0 vol % of an epoxy compound.

9 Claims, No Drawings

LUBRICANT COMPOSITIONS FOR REFRIGERATING MACHINE EMPLOYING HFC-32, HFC-125 OR HFC-134A

BACKGROUND OF THE INVENTION

1. Field of the Invention

The present invention relates to a refrigerating machine oil and a fluid composition for operating a refrigerating machine, more specifically a lubricant composition for a refrigerating machine employing a HFC-type refrigerant which contains at least one of HFC-32, HFC-125 and HFC-134a and using an ester having a specific structure alone or as a mixture of various types.

2. Discussion of Background

In recent years, by the problem of the depletion of ozone layer, CFC (chlorofluorocarbon) and HCFC (hydrochlorofluorocarbon) conventionally used as refrigerants for refrigerating machines, have been prohibited by regulations, and HFC (hydrofluorocarbon) has been used as a refrigerant instead of them. As a refrigerating machine oil for the HFC refrigerant, PAG (polyalkylene glycol), esters and the like which are compatible with HFC, have been studied or employed. For example, PAG is disclosed in U.S. Pat. No. 4,755,316, JP-A-1-198694, JP-A-1-256594, JP-A-1-259093, JP-A-1-259094, JP-A-1-259095, JP-A-1-274191, JP-A-2-43290, JP-A-2-55791 and JP-A-2-84491. The esters are disclosed in Japanese PCT publication No. 3-505602, JP-A-3-55791, JP-A-3-88892, JP-A-2-128991, JP-A-2-128992, JP-A-3-200895, JP-A-3-227397, JP-A-4-20597, JP-A-4-72390, JP-A-4-218592 and JP-A-4-218593. However, PAG has drawbacks of a high moisture adsorption and poor electrical insulating properties. On the other hand, ester oils may undergo hydrolysis and form an acid due to its structure, and the formed acid will be expected to cause various inconveniences in the refrigerating machine system. Further, these oils tend to be inferior in the lubricating properties to a conventional system of a mineral oil and CFC/HCFC or a conventional system of a mineral oil, an alkylbenzene and CFC/HCFC, whereby it has been studied to incorporate various additives thereto. The refrigerating machine oil is susceptible to the high temperature and high pressure atmosphere in a refrigerating compressor, or stains due to e.g. thermal decomposition of the refrigerating machine oil tend to attach within the compressor. These drawbacks bring about new problems. Under such circumstances, the present inventors have made extensive studies to improve the cleanness in the compressor, and as a result, found that the cleanness of various types of compressors can be improved by incorporating specific additives in specific amounts. They have accomplished the present invention based on the discovery.

SUMMARY OF THE INVENTION

It is an object of the present invention to provide a refrigerating machine oil employing at least one of HFC-32, HFC-125 and HFC-134a as a refrigerant, by which the anti-corrosion properties and the cleanness in the compressor are excellent, the cleanness can be maintained particularly within the compressor over a long period of time, and a high reliability can be obtained.

The present invention provides a lubricant composition for a refrigerating machine employing a HFC type refrigerant containing at least one selected from the group consisting of HFC-32, HFC-125 and HFC-134a, which comprises a base oil of an ester formed from a dihydric or higher polyol as an alcohol and a monobasic aliphatic acid, alone or as a mixture thereof; and additives of, based on the total amount, 1) not less than 0.01 vol % and less than 1.0 vol % of a phosphate, 2) from 0.01 to 1.0 vol % of at least one of an alkylphosphorothionate and an arylphosphorothionate and 3) from 0.01 to 1.0 vol % of an epoxy compound.

DESCRIPTION OF THE PREFERRED EMBODIMENTS

Hereinafter, the present invention will be described in further detail.

In the present invention, as an ester for the base oil of the refrigerating machine oil composition, any synthetic esters composed of a dihydric or higher alcohol and a monobasic aliphatic acid may be used. The alcohol is preferably a neopentyl glycol, trimethylolpropane, pentaerythritol and dipentaerythritol, more preferably trimethylolpropane and pentaerythritol. As the monobasic aliphatic acid, propionic acid, isopropionic acid, butanoic acid, isobutanoic acid, pentanoic acid, isopentanoic acid, hexanoic acid, heptanoic acid, isoheptanoic acid, octanoic acid, isooctanoic acid, 2-ethylhexanoic acid, nonanoic acid, isononanoic acid, 3,5,5-trimethylhexanoic acid, decanoic acid, undecanoic acid and lauric acid may be mentioned. These monobasic aliphatic acids may be used alone or as a mixture of two or more of them for esterification reaction. Further, the blend ratio thereof may be changed optionally depending upon the refrigerating machines to be used. However, it should be mentioned that these are used for the base oil and the addition thereof does not contribute to the improvement of the cleanness of the compressor. The cleanness of the compression can be improved by adding 1) a phosphate, 2) at least one of an arylphosphorothionate and an alkylphosphorothionate and 3) an epoxy compound to the base oil. Here, as the phosphate of the component 1), tributylphosphate, trihexylphosphate, trioctylphosphate, trinonylphosphate, tridecylphosphate, trioleylphosphate, triphenylphosphate, tricresylphosphate, phenyldiisopropylphenylphosphate and tris(isopropylphenyl) phosphate may, for example, be mentioned. Particularly preferred are phenyl-diisopropylphenylphosphate, tris(isopropylphenyl)phosphate and tricresylphosphate. As the arylphosphorothionate and alkylphosphorothionate of the component 2), trihexylphosphorothionate, triphenylphosphorothionate tris(methylphenyl)phosphorothionate and tris(isobutylphenyl)phosphorothionate may, for example, be mentioned. Among them, triphenylphosphorothionate is particularly preferred. Further, as the epoxy compound, 1,2-epoxyhexane, 1,2-epoxyheptane, 1,2-epoxyoctane, 1,2-epoxydecane, 1,2-epoxyundecane, 1,2-epoxydodecane, 1,2-epoxytetradecane, 1,2-epoxyhexadecane, 1,2-epoxyheptadecane and 1,2-epoxyoctadecane, and as an alicyclic epoxy compound, vinylcyclohexene dioxide and 1-methyl-4-(2-methyloxiranyl)-7-oxabicyclo[4.1.0]heptane, may, for example, be mentioned. These may be used alone or as a mixture thereof without any problem. However, it is particularly preferred to use 1,2-epoxydecane, vinylcyclohexene dioxide and 1-methyl-4-(2-methyloxiranyl)-7-oxabicyclo[4.1.0]heptane alone or in combination.

The above three additives are preferably incorporated in such ratio that 1):2):3)=not less than 0.1 vol % and less than 1.0 vol %:0.1 to 1.0 vol %:0.01 to 0.5 vol %, more preferably 1):2):3)=0.1 to 0.7 vol %:0.1 to 0.7 vol %:0.1 to 0.5 vol %, based on the total amount.

For the refrigerating machine oil composition of the present invention, conventional additives such as an antioxidant, a metal deactivator or a defoaming agent may be used within such a range that the cleanness intended in the present invention can be improved.

As the antioxidant, for example, ones of a hindered phenol type, an amine type or a sulfur type, such as, 2,6-di-t-butyl-4-methylphenol, 4,4'-methylenebis(2,6-di-butylphenol), 2,2'-thiobis(4-methyl-6-t-butylphenol), p,p'-dioctyldiphenylamine, 3,7-dioctylphenothiazine, phenyl-α-naphthylamine and an alkyldisulfide may, for example, be mentioned.

As the metal deactivator, alizarin, quinizarin and benzotriazole may, for example, be used.

As the defoaming agent, dimethylpolysiloxane and carbonic acid metal salts may, for example, be used. These additives may be incorporated alone or as a mixture of two or more of them. The amounts of the additives i.e. the antioxidant, metal deactivator and defoaming agent are usually not more than 10 vol %, preferably not more than 5 vol % based on the total amount.

Hereinafter, the refrigerant used for the refrigerating machine employing the refrigerating machine oil of the present invention will be described. First, when the HFC type refrigerant is HFC-32, the refrigerant used for the refrigerating machine employing the refrigerating machine oil of the present invention is HFC-32 alone, or ones having a $C_{1-3}$, preferably $C_{1-2}$ alkanefluoride blended to the HFC-32. In this case, such a refrigerant mixture contains at least 20 wt % of difluoromethane (HFC-32), less than 50 wt % of HFC-134a and less than 30 wt % of HFC-125. When HFC-32 is blended for use, HFC-32 is contained in an amount of preferably at least 30 wt %, more preferably at least 40 wt %. The HFC type refrigerant which can be blended with HFC-32 is not particularly limited, and specifically, HFC such as trifluoromethane (HFC-23), pentafluoroethane (HFC-125), 1,1,2,2-tetrafluoroethane (HFC-134a), 1,1,1,2-tetrafluoroethane (HFC-134a), 1,1,1-trifluoroethane (HFC-143a) and 1,1-difluoroethane (HFC-152a) may, for example, be mentioned.

When the HFC type refrigerant of the present invention is mainly composed of HFC-125, the refrigerant used for the refrigerating machine employing the refrigerating machine oil of the present invention is a $C_{1-3}$, preferably $C_{1-2}$ alkanefluoride, and contains pentafluoroethane (HFC-125) in an amount of usually at least 30 wt %, preferably at least 35 wt %, more preferably at least 40 wt %. The HFC type refrigerant which can be blended to HFC-125 is not particularly limited, and specifically HFC such as trifluoromethane (HFC-23), difluoromethane (HFC-32), 1,1,2,2-tetrafluoroethane (HFC-134), 1,1,1,2-tetrafluoroethane (HFC-134a), 1,1,1-trifluoroethane (HFC-143a) and 1,1-difluoroethane (HFC-152a) may, for example, be mentioned.

As the HFC refrigerant containing HFC-125 used in the present invention, more specifically, HFC-125 alone; a mixture of HFC-125/HFC-32=30 to 60 wt %/70 to 40 wt %; a mixture of HFC-125/HFC143a=40 to 60 wt %/60 to 40 wt %; and a mixture of HFC-125/HFC-134a/HFC-143a=35 to 55 wt %/1 to 15 wt %/40 to 60 wt %, may, for example, be mentioned.

Further, when the HFC type refrigerant used in the present invention is mainly composed of HFC-134a, the refrigerant used for the refrigerating machine employing the refrigerating machine oil of the present invention is a $C_{1-3}$, preferably $C_{1-2}$ alkanefluoride, and contains at least 50 wt % of 1,1,1,2-tetrafluoroethane (HFC-134a) (except the case where at least 30 wt % of HFC-125 is contained). The HFC type refrigerant which can be blended with HFC-134a is not particularly limited, and specifically, HFC such as trifluoromethane (HFC-23), difluoromethane (HFC-32), 1,1,2,2-tetrafluoroethane (HFC-134), 1,1,1-trifluoroethane (HFC-143a) and 1,1-difluoroethane (HFC-152a) may, for example, be mentioned.

As the HFC refrigerant containing HFC-134a used in the present invention, more specifically, HFC-134a alone; a mixture of HFC-134a/HFC-32=60 to 80 wt %/40 to 20 wt %; and a mixture of HFC-134a/HFC-32/HFC-125=50 to 70 wt %/15 to 35 wt %/5 to 19.9 wt %, may, for example, be mentioned. As the commercial products of such refrigerants, SUVA AC9100: R-407C manufactured by Du Pont Corporation Ltd. (HFC-125:HFC-134a:HFC-32=25:52:23) and SUVA HP-62: R-404A (HFC-125:HFC-134a:HFC-143a=44:4:52) manufactured by Du Pont Corporation Ltd. may, for example, be mentioned. There is no problem even if a HC type refrigerant is further blended thereto.

The refrigerating machine oil composition of the present invention usually forms a mixture with the above-mentioned refrigerant in a refrigerating machine, and the blend ratio may optionally be selected depending upon the type of the machines. The refrigerating machine oil composition of the present invention is preferably used for air conditioners or refrigerators having a closed type compressor of, for example, reciprocating type or rotating type such as scroll or rotary, from the viewpoint of its excellent compressor cleaning performance. The refrigerating machine oil composition of the present invention is further applicable to, for example, dehumidifiers, freezers, refrigerated warehouses, vending machines, showcases and chemical plants, and further ones having centrifugal compressors.

EXAMPLES

Now, the present invention will be described in further detail with reference to Examples and Comparative Examples. However, it should be mentioned that the present invention is by no means restricted to these Examples.

The ester used in experiments was an ester formed from pentaerythritol as the alcohol and a mixture of isooctanoic acid and isononanoic acid as the acid, with 56.2 mm$^2$/s@40° C. and a total acid number of 0.01 mg KOH/g. As the additives, tricresylphosphate as an anti-abrasion agent I, triphenylphosphorothionate as an anti-abrasion agent II and, as the epoxy compound, 1,2-epoxydecane in Examples 1 to 7, 9 to 15, 17 to 23, 25 to 31, 33 to 53 and 55 to 75, and 1-methyl-4-(2-methyloxiranyl)-7-oxabicyclo[4.1.0]heptane in Examples 8, 16, 24, 32 and 54, were used. Tables 1 to 22 show the formulations of the refrigerating machine oil compositions used in Examples and Comparative Examples and the results of experiments. In the Tables, the incorporated amounts of the additives are represented by vol %, based on the total amount.

Evaluation Test 1

Using a rotary type compressor or a scroll type compressor, 500 ml of a sample oil and 1,000 g of a refrigerant (HFC-32) were charged therein, and continuous operation was conducted at a discharge pressure of from 20 to 30 kg/cm$^2$, a discharge temperature of from 70 to 140° C. and the sample oil temperature of from 100 to 160° C. for 2,000 hours, and the cleanness in the compressor was evaluated. Here, the cleanness was evaluated by the stains and the degree of discoloration in the compressor. For the evaluation, according to the conventional knowledge, existing product (alkylbenene/R-22) was referred to grade 10, and the one with the grade of less than 10 was a passing mark and the one with the grade 1 was the best.

As indicated in the results of evaluation in Tables 1 to 6, Examples 1 to 16 which fall within the scope of the present invention all show the cleanness of less than 10 and are thereby found to be excellent in the cleanness. On the other hand, Comparative Examples 1 to 7 show the results of evaluation using a scroll type compressor.

In Comparative Example 1, the base oil was used alone and the cleanness was poor.

In Comparative Examples 2 to 4, each of the essential three additives was added, and the cleanness was poor with each additive alone although the amount thereof was within the scope of the present invention.

In Comparative Examples 5 to 7, two types of the essential three additives were incorporated, and the cleanness was poor.

Comparative Examples 8 to 24 show the results when a rotary type compressor was used. In Comparative Example 8, the base oil was used alone, and it was found that the cleanness was poor with the base oil alone and still inferior to the case where the scroll type compressor was used.

In Comparative Examples 9 to 11, each of the essential three additives was used alone and the cleanness was poor.

In Comparative Examples 12 to 14, two types of the essential three additives were combined, respectively, and it was found that the effects on the cleanness were poor although the amounts thereof were within the ranges of the present invention.

In Comparative Examples 15 to 23, all essential three additives were incorporated. In Comparative Example 15, the amount of the anti-abrasion agent I exceeded the range of the present invention and the cleanness was thereby poor.

In Comparative Example 16, the amount of the anti-abrasion agent II exceeded the range of the present invention and the cleanness was poor.

In Comparative Example 17, the amount of the epoxy compound exceeded the range of the present invention and the cleanness was poor.

In Comparative Example 18, the amounts of the anti-abrasion agent I and the anti-abrasion agent II exceeded the ranges of the present invention and the cleanness was poor.

In Comparative Example 19, the amounts of the anti-abrasion agent II and the epoxy compound exceeded the ranges of the present invention and the cleanness was poor.

In Comparative Example 20, the amounts of the anti-abrasion agent I and the epoxy compound exceeded the ranges of the present invention and the cleanness was poor.

In Comparative Example 21, the amounts of all essential three additives exceeded the ranges of the present invention and the cleanness was poor.

In Comparative Example 22, the amounts of all essential three additives were less than the ranges of the present invention and the cleanness was poor.

Comparative Example 23 was the case where R-22 was used as a refrigerant with the additives contained in amounts within the ranges of the present invention, and the cleanness was poor even in this combination.

Comparative Example 24 shows the existing combination of alkylbenzene/R-22.

TABLE 1

| Example | 1 | 2 | 3 | 4 | 5 | 6 | 7 | 8 |
|---|---|---|---|---|---|---|---|---|
| Refrigerant | \multicolumn{8}{c}{HFC-32} |
| Compressor | \multicolumn{8}{c}{Scroll type} |
| Base oil | \multicolumn{8}{c}{Pentaerythritol ester} |
| Additives | | | | | | | | |
| Anti-oxidant | 0.2 | 0.2 | 0.2 | 0.2 | 0.2 | 0.2 | 0.2 | 0.2 |
| Anti-abrasion agent I | 0.1 | 0.5 | 0.9 | 0.1 | 0.1 | 0.9 | 0.9 | 0.1 |
| Anti-abrasion agent II | 0.1 | 0.5 | 1.0 | 1.0 | 1.0 | 0.1 | 0.1 | 0.1 |
| Epoxy compound | 0.1 | 0.5 | 1.0 | 0.1 | 0.9 | 0.1 | 1.0 | 0.1 |
| Evaluation (stain) | 1 | 3 | 7 | 5 | 7 | 4 | 5 | 1 |

TABLE 2

| Example | 9 | 10 | 11 | 12 | 13 | 14 | 15 | 16 |
|---|---|---|---|---|---|---|---|---|
| Refrigerant | | | | HFC-32 | | | | |
| Compressor | | | | Rotary type | | | | |
| Base Oil | | | | Pentaerythritol ester | | | | |
| Additives | | | | | | | | |
| Anti-oxidant | 0.2 | 0.2 | 0.2 | 0.2 | 0.2 | 0.2 | 0.2 | 0.2 |
| Anti-abrasion agent I | 0.1 | 0.5 | 0.9 | 0.1 | 0.1 | 0.9 | 0.9 | 0.1 |
| Anti-abrasion agent II | 0.1 | 0.5 | 1.0 | 1.0 | 1.0 | 0.1 | 0.1 | 0.1 |
| Epoxy compound | 0.1 | 0.5 | 1.0 | 0.1 | 0.9 | 0.1 | 1.0 | 0.1 |
| Evaluation (stain) | 3 | 5 | 3 | 6 | 8 | 5 | 5 | 3 |

TABLE 3

| Comparative Example | 1 | 2 | 3 | 4 | 5 | 6 | 7 |
|---|---|---|---|---|---|---|---|
| Refrigerant | | | | HFC-32 | | | |
| Compressor | | | | Scroll type | | | |
| Base oil | | | | Pentaerythritol ester | | | |
| Additives | | | | | | | |
| Anti-oxidant | — | 0.2 | 0.2 | 0.2 | 0.2 | 0.2 | 0.2 |
| Anti-abrasion agent I | — | 0.5 | — | — | 0.5 | 0.5 | — |
| Anti-abrasion agent II | — | — | 0.5 | — | 0.5 | — | 0.5 |
| Epoxy compound | — | — | — | 0.2 | — | 0.2 | 0.2 |
| Evaluation (stain) | 14 | 12 | 13 | 11 | 13 | 12 | 13 |

TABLE 4

| Comparative Example | 8 | 9 | 10 | 11 | 12 | 13 | 14 |
|---|---|---|---|---|---|---|---|
| Refrigerant | | | | HFC-32 | | | |
| Compressor | | | | Rotary type | | | |
| Base Oil | | | | Pentaerythritol ester | | | |
| Additives | | | | | | | |
| Anti-oxidant | — | 0.2 | 0.2 | 0.2 | 0.2 | 0.2 | 0.2 |
| Anti-abrasion agent I | — | 0.5 | — | — | 0.5 | 0.5 | — |
| Anti-abrasion agent II | — | — | 0.5 | — | 0.5 | — | 0.5 |
| Epoxy compound | — | — | — | 0.2 | — | 0.2 | 0.2 |
| Evaluation (stain) | 16 | 14 | 15 | 12 | 15 | 13 | 16 |

TABLE 5

| Comparative Example | 15 | 16 | 17 | 13 | 19 | 20 | 21 |
|---|---|---|---|---|---|---|---|
| Refrigerant | | | | HFC-32 | | | |
| Compressor | | | | Rotary type | | | |
| Base oil | | | | Pentaerythritol ester | | | |
| Additives | | | | | | | |
| Anti-oxidant | 0.2 | 0.2 | 0.2 | 0.2 | 0.2 | 0.2 | 0.2 |
| Anti-abrasion agent I | 1.0 | 0.5 | 0.9 | 1.5 | 0.5 | 1.5 | 1.5 |

TABLE 5-continued

| Comparative Example | 15 | 16 | 17 | 13 | 19 | 20 | 21 |
|---|---|---|---|---|---|---|---|
| Anti-abrasion agent II | 0.1 | 1.5 | 1.0 | 1.5 | 1.5 | 0.5 | 1.5 |
| Epoxy compound | 0.1 | 0.5 | 2.0 | 0.1 | 2.0 | 2.0 | 2.0 |
| Evaluation (stain) | 11 | 13 | 15 | 17 | 14 | 14 | 18 |

TABLE 6

| | Comparative Example | | |
|---|---|---|---|
| | 22 | 23 | 24 |
| Refrigerant | HFC-32 | | R-22 |
| Compressor | | Rotary type | |
| Base oil | Pentaerythritol ester | | Alkylbenzene |
| Additives | | | |
| Anti-oxidant | 0.2 | 0.2 | 0.2 |
| Anti-abrasion agent I | 0.005 | 0.5 | 0.5 |
| Anti-abrasion agent II | 0.005 | 0.5 | — |
| Epoxy compound | 0.005 | 0.5 | — |
| Evaluation (stain) | 13 | 12 | 10 |

Evaluation Test 2

Using a rotary type compressor or a scroll type compressor, 500 ml of a sample oil and 1,000 g of a refrigerant (in Examples 33 to 46, HFC-125 alone and, in others, R-410A (HFC-125:HFC-32=50:50) or R-22) were charged therein, and continuous operation was conducted at a discharge pressure of from 16 to 28 kg/cm$^2$, a discharge temperature of from 70 to 140° C. and the sample oil temperature of from 100 to 160° C. for 2,000 hours, and the cleanness in the compressor was evaluated. Here, the cleanness was evaluated by the stains and the degree of discoloration in the compressor. For the evaluation, according to the conventional knowledge, existing product (alkylbenene/R-22) was referred to grade 10, and the one with the grade of less than 10 was a passing mark and the one with the grade 1 was the best.

As indicated in the results of evaluation in Tables 7 to 14, Examples 17 to 46 which fall within the scope of the present invention all show the cleanness of less than 10 and are thereby found to be excellent in the cleanness. On the other hand, Comparative Examples 25 to 31 show the results of evaluation using a scroll type compressor.

In Comparative Example 25, the base oil was used alone and the cleanness was poor.

In Comparative Examples 26 to 28, each of the essential three additives was added, and the cleanness was poor with each additive alone although the amount thereof was within the scope of the present invention.

In Comparative Examples 29 to 31, two types of the essential three additives were incorporated, and the cleanness was poor.

Comparative Examples 32 to 48 show the results when a rotary type compressor was used. In Comparative Example 32, the base oil was used alone, and it was found that the cleanness was poor with the base oil alone and still inferior to the case where the scroll type compressor was used.

In Comparative Examples 33 to 35, each of the essential three additives was used alone and the cleanness was poor.

In Comparative Examples 36 to 38, two types of the essential three additives were combined, respectively, and it was found that the effects on the cleanness were poor although the amounts thereof were within the ranges of the present invention.

In Comparative Examples 39 to 43, all essential three additives were incorporated. In Comparative Example 39, the amount of the anti-abrasion agent I exceeded the range of the present invention and the cleanness was thereby poor.

In Comparative Example 40, the amount of the anti-abrasion agent II exceeded the range of the present invention and the cleanness was poor.

In Comparative Example 41, the amount of the epoxy compound exceeded the range of the present invention and the cleanness was poor.

In Comparative Example 42, the amounts of the anti-abrasion agent I and the anti-abrasion agent II exceeded the ranges of the present invention and the cleanness was poor.

In Comparative Example 43, the amounts of the anti-abrasion agent II and the epoxy compound exceeded the ranges of the present invention and the cleanness was poor.

In Comparative Example 44, the amounts of the anti-abrasion agent I and the epoxy compound exceeded the ranges of the present invention and the cleanness was poor.

In Comparative Example 45, the amounts of all essential three additives exceeded the ranges of the present invention and the cleanness was poor.

In Comparative Example 46, the amounts of all essential three additives were less than the ranges of the present invention and the cleanness was poor.

Comparative Example 47 was the case where R-22 was used as a refrigerant with the additives contained in amounts within the ranges of the present invention, and the cleanness was poor even in this combination.

Comparative Example 48 shows the existing combination of alkylbenzene/R-22.

TABLE 7

| Example | 17 | 18 | 19 | 20 | 21 | 22 | 23 | 24 |
|---|---|---|---|---|---|---|---|---|
| Refrigerant | | | | R-410A | | | | |
| Compressor | | | | Scroll type | | | | |
| Base Oil | | | | Pentaerythritol ester | | | | |
| Additives | | | | | | | | |
| Anti-oxidant | 0.2 | 0.2 | 0.2 | 0.2 | 0.2 | 0.2 | 0.2 | 0.2 |
| Anti-abrasion agent I | 0.1 | 0.5 | 0.9 | 0.1 | 0.1 | 0.9 | 0.9 | 0.1 |
| Anti-abrasion agent II | 0.1 | 0.5 | 1.0 | 1.0 | 1.0 | 0.1 | 0.1 | 0.1 |
| Epoxy compound | 0.1 | 0.5 | 1.0 | 0.1 | 0.9 | 0.1 | 1.0 | 0.1 |
| Evaluation (stain) | 1 | 3 | 7 | 5 | 7 | 4 | 5 | 1 |

TABLE 8

| Example | 25 | 26 | 27 | 28 | 29 | 30 | 31 | 32 |
|---|---|---|---|---|---|---|---|---|
| Refrigerant | | | | R-410A | | | | |
| Compressor | | | | Rotary type | | | | |
| Base oil | | | | Pentaerythritol ester | | | | |
| Additives | | | | | | | | |
| Anti-oxidant | 0.2 | 0.2 | 0.2 | 0.2 | 0.2 | 0.2 | 0.2 | 0.2 |
| Anti-abrasion agent I | 0.1 | 0.5 | 0.9 | 0.1 | 0.1 | 0.9 | 0.9 | 0.1 |
| Anti-abrasion agent II | 0.1 | 0.5 | 1.0 | 1.0 | 1.0 | 0.1 | 0.1 | 0.1 |
| Epoxy compound | 0.1 | 0.5 | 1.0 | 0.1 | 0.9 | 0.1 | 1.0 | 0.1 |
| Evaluation (stain) | 3 | 5 | 8 | 6 | 8 | 5 | 5 | 3 |

TABLE 9

| Example | 33 | 34 | 35 | 36 | 37 | 38 | 39 |
|---|---|---|---|---|---|---|---|
| Refrigerant | HFC-125 | | | | | | |
| Compressor | Scroll type | | | | | | |
| Base oil | Pentaerythritol ester | | | | | | |
| Additives | | | | | | | |
| Anti-oxidant | 0.2 | 0.2 | 0.2 | 0.2 | 0.2 | 0.2 | 0.2 |
| Anti-abrasion agent I | 0.1 | 0.5 | 0.9 | 0.1 | 0.1 | 0.9 | 0.9 |
| Anti-abrasion agent II | 0.1 | 0.5 | 1.0 | 1.0 | 1.0 | 0.1 | 0.1 |
| Epoxy compound | 0.1 | 0.5 | 1.0 | 0.1 | 0.9 | 0.1 | 1.0 |
| Evaluation (stain) | 1 | 3 | 7 | 5 | 7 | 4 | 5 |

TABLE 10

| Example | 40 | 41 | 42 | 43 | 44 | 45 | 46 |
|---|---|---|---|---|---|---|---|
| Refrigerant | HFC-125 | | | | | | |
| Compressor | Rotary type | | | | | | |
| Base oil | Pentaerythritol ester | | | | | | |
| Additives | | | | | | | |
| Anti-oxidant | 0.2 | 0.2 | 0.2 | 0.2 | 0.2 | 0.2 | 0.2 |
| Anti-abrasion agent I | 0.1 | 0.5 | 0.9 | 0.1 | 0.1 | 0.9 | 0.9 |
| Anti-abrasion agent II | 0.1 | 0.5 | 1.0 | 1.0 | 1.0 | 0.1 | 0.1 |
| Epoxy compound | 0.1 | 0.5 | 1.0 | 0.1 | 0.9 | 0.1 | 1.0 |
| Evaluation (stain) | 3 | 5 | 8 | 6 | 8 | 5 | 5 |

TABLE 11

| Comparative Example | 25 | 26 | 27 | 28 | 29 | 30 | 31 |
|---|---|---|---|---|---|---|---|
| Refrigerant | R-410A | | | | | | |
| Compressor | Scroll type | | | | | | |
| Base oil | Pentaerythritol ester | | | | | | |
| Additives | | | | | | | |
| Anti-oxidant | — | 0.2 | 0.2 | 0.2 | 0.2 | 0.2 | 0.2 |
| Anti-abrasion agent I | — | 0.5 | — | — | 0.5 | 0.5 | — |
| Anti-abrasion agent II | — | — | 0.5 | — | 0.5 | — | 0.5 |
| Epoxy compound | — | — | — | 0.2 | — | 0.2 | 0.2 |
| Evaluation (stain) | 14 | 12 | 13 | 11 | 13 | 12 | 13 |

TABLE 12

| Comparative Example | 32 | 33 | 34 | 35 | 36 | 37 | 38 |
|---|---|---|---|---|---|---|---|
| Refrigerant | R-410A | | | | | | |
| Compressor | Rotary type | | | | | | |
| Base Oil | Pentaerythritol ester | | | | | | |
| Additives | | | | | | | |
| Anti-oxidant | — | 0.2 | 0.2 | 0.2 | 0.2 | 0.2 | 0.2 |
| Anti-abrasion agent I | — | 0.5 | — | — | 0.5 | 0.5 | — |
| Anti-abrasion agent II | — | — | 0.5 | — | 0.5 | — | 0.5 |
| Epoxy compound | — | — | — | 0.2 | — | 0.2 | 0.2 |
| Evaluation (stain) | 16 | 14 | 15 | 12 | 15 | 13 | 16 |

TABLE 14

| Comparative Example | 46 | 47 | 48 |
|---|---|---|---|
| Refrigerant | R-410A | | R-22 |
| Compressor | Rotary type | | |
| Base oil | Pentaerythritol ester | | Alkylbenzene |
| Additives | | | |
| Anti-oxidant | 0.2 | 0.2 | 0.2 |
| Anti-abrasion agent I | 0.005 | 0.5 | 0.5 |
| Anti-abrasion agent II | 0.005 | 0.5 | — |
| Epoxy compound | 0.005 | 0.5 | — |
| Evaluation (stain) | 13 | 12 | 10 |

TABLE 14

| Comparative Example | 46 | 47 | 48 |
|---|---|---|---|
| Refrigerant | R-410A | | R-22 |
| Compressor | Rotary type | | |
| Base oil | Pentaerythritol ester | | Alkylbenzene |
| Additives | | | |
| Anti-oxidant | 0.2 | 0.2 | 0.2 |
| Anti-abrasion agent I | 0.005 | 0.5 | 0.5 |
| Anti-abrasion agent II | 0.005 | 0.5 | — |
| Epoxy compound | 0.005 | 0.5 | — |
| Evaluation (stain) | 13 | 12 | 10 |

Evaluation Test 3

Using a rotary type compressor or a scroll type compressor, 500 ml of a sample oil and 1,000 g of a refrigerant (in Examples 62 to 75, HFC-134a alone and, in others, R-407C (HFC-125:HFC-134a:HFC-32=25:52:23) or R-22) were charged therein, and continuous operation was conducted at a discharge pressure of from 16 to 28 kg/cm$^2$, a discharge temperature of from 70 to 140° C. and the sample oil temperature of from 100 to 160° C. for 2,000 hours, and the cleanness in the compressor was evaluated. Here, the cleanness was evaluated by the stains and the degree of discoloration in the compressor. For the evaluation, according to the conventional knowledge, existing product (alkylbenene/R-22) was referred to grade 10, and the one with the grade of less than 10 was a passing mark and the one with the grade 1 was the best.

As indicated in the results of evaluation in Tables 15 to 22, Examples 47 to 75 which fall within the scope of the present invention all show the cleanness of less than 10 and are thereby found to be excellent in the cleanness. On the other hand, Comparative Examples 49 to 55 show the results of evaluation using a scroll type compressor.

In Comparative Example 49, the base oil was used alone and the cleanness was poor.

In Comparative Examples 50 to 52, each of the essential three additives was added, and the cleanness was poor with each additive alone although the amount thereof was within the scope of the present invention.

In Comparative Examples 53 to 55, two types of the essential three additives were incorporated, and the cleanness was poor.

Comparative Examples 56 to 72 show the results when a rotary type compressor was used. In Comparative Example 56, the base oil was used alone, and it was found that the cleanness was poor with the base oil alone and still inferior to the case where the scroll type compressor was used.

In Comparative Examples 57 to 59, each of the essential three additives was used alone and the cleanness was poor.

In Comparative Examples 60 to 62, two types of the essential three additives were combined, respectively, and it was found that the effects on the cleanness were poor although the amounts thereof were within the ranges of the present invention.

In Comparative Examples 63 to 67, all essential three additives were incorporated. In Comparative Example 63, the amount of the anti-abrasion agent I exceeded the range of the present invention and the cleanness was thereby poor.

In Comparative Example 64, the amount of the anti-abrasion agent II exceeded the range of the present invention and the cleanness was poor.

In Comparative Example 65, the amount of the epoxy compound exceeded the range of the present invention and the cleanness was poor.

In Comparative Example 66, the amounts of the anti-abrasion agent I and the anti-abrasion agent II exceeded the ranges of the present invention and the cleanness was poor.

In Comparative Example 67, the amounts of the anti-abrasion agent II and the epoxy compound exceeded the ranges of the present invention and the cleanness was poor.

In Comparative Example 68, the amounts of the anti-abrasion agent I and the epoxy compound exceeded the ranges of the present invention and the cleanness was poor.

In Comparative Example 69, the amounts of all essential three additives exceeded the ranges of the present invention and the cleanness was poor.

In Comparative Example 70, the amounts of all essential three additives were less than the ranges of the present invention and the cleanness was poor.

Comparative Example 71 was the case where R-22 was used as a refrigerant with the additives contained in amounts within the ranges of the present invention, and the cleanness was poor even in this combination.

Comparative Example 72 shows the existing combination of alkylbenzene/R-22.

TABLE 15

| Example | 47 | 48 | 49 | 50 | 51 | 52 | 53 | 54 |
|---|---|---|---|---|---|---|---|---|
| Refrigerant | R-407C | | | | | | | |
| Compressor | Scroll type | | | | | | | |
| Base oil | Pentaerythritol ester | | | | | | | |
| Additives | | | | | | | | |
| Anti-oxidant | 0.2 | 0.2 | 0.2 | 0.2 | 0.2 | 0.2 | 0.2 | 0.2 |
| Anti-abrasion agent I | 0.1 | 0.5 | 0.9 | 0.1 | 0.1 | 0.9 | 0.9 | 0.1 |
| Anti-abrasion agent II | 0.1 | 0.5 | 1.0 | 1.0 | 1.0 | 0.1 | 0.1 | 0.1 |
| Epoxy compound | 0.1 | 0.5 | 1.0 | 0.1 | 0.9 | 0.1 | 1.0 | 0.1 |
| Evaluation (stain) | 1 | 3 | 7 | 5 | 7 | 4 | 5 | 1 |

TABLE 16

| Example | 55 | 56 | 57 | 58 | 59 | 60 | 61 |
|---|---|---|---|---|---|---|---|
| Refrigerant | R-407C | | | | | | |
| Compressor | Rotary type | | | | | | |
| Base oil | Pentaerythritol ester | | | | | | |
| Additives | | | | | | | |
| Anti-oxidant | 0.2 | 0.2 | 0.2 | 0.2 | 0.2 | 0.2 | 0.2 |
| Anti-abrasion agent I | 0.1 | 0.5 | 0.9 | 0.1 | 0.1 | 0.9 | 0.9 |

TABLE 16-continued

| Example | 55 | 56 | 57 | 58 | 59 | 60 | 61 |
|---|---|---|---|---|---|---|---|
| Anti-abrasion agent II | 0.1 | 0.5 | 1.0 | 1.0 | 1.0 | 0.1 | 0.1 |
| Epoxy compound | 0.1 | 0.5 | 1.0 | 0.1 | 0.9 | 0.1 | 1.0 |
| Evaluation (stain) | 3 | 5 | 8 | 6 | 7 | 4 | 5 |

TABLE 17

| Example | 62 | 63 | 64 | 65 | 66 | 67 | 68 |
|---|---|---|---|---|---|---|---|
| Refrigerant | HFC-134a | | | | | | |
| Compressor | Scroll type | | | | | | |
| Base oil | Pentaerythritol ester | | | | | | |
| Additives | | | | | | | |
| Anti-oxidant | 0.2 | 0.2 | 0.2 | 0.2 | 0.2 | 0.2 | 0.2 |
| Anti-abrasion agent I | 0.1 | 0.5 | 0.9 | 0.1 | 0.1 | 0.9 | 0.9 |
| Anti-abrasion agent II | 0.1 | 0.5 | 1.0 | 1.0 | 1.0 | 0.1 | 0.1 |
| Epoxy compound | 0.1 | 0.5 | 1.0 | 0.1 | 0.9 | 0.1 | 1.0 |
| Evaluation (stain) | 1 | 3 | 7 | 5 | 7 | 4 | 5 |

TABLE 18

| Example | 69 | 70 | 71 | 72 | 73 | 74 | 75 |
|---|---|---|---|---|---|---|---|
| Refrigerant | HFC-134a | | | | | | |
| Compressor | Rotary type | | | | | | |
| Base oil | Pentaerythritol ester | | | | | | |
| Additives | | | | | | | |
| Anti-oxidant | 0.2 | 0.2 | 0.2 | 0.2 | 0.2 | 0.2 | 0.2 |
| Anti-abrasion agent I | 0.1 | 0.5 | 0.9 | 0.1 | 0.1 | 0.9 | 0.9 |
| Anti-abrasion agent II | 0.1 | 0.5 | 1.0 | 1.0 | 1.0 | 0.1 | 0.1 |
| Epoxy compound | 0.1 | 0.5 | 1.0 | 0.1 | 0.9 | 0.1 | 1.0 |
| Evaluation (stain) | 3 | 5 | 8 | 6 | 8 | 5 | 5 |

TABLE 19

| Comparative Example | 49 | 50 | 51 | 52 | 53 | 54 | 55 |
|---|---|---|---|---|---|---|---|
| Refrigerant | R-407C | | | | | | |
| Compressor | Scroll type | | | | | | |
| Base Oil | Pentaerythritol ester | | | | | | |
| Additives | | | | | | | |
| Anti-oxidant | — | 0.2 | 0.2 | 0.2 | 0.2 | 0.2 | 0.2 |
| Anti-abrasion agent I | — | 0.5 | — | — | 0.5 | 0.5 | — |
| Anti-abrasion agent II | — | — | 0.5 | — | 0.5 | — | 0.5 |
| Epoxy compound | — | — | — | 0.2 | — | 0.2 | 0.2 |
| Evaluation (stain) | 13 | 12 | 13 | 11 | 13 | 12 | 13 |

TABLE 20

| Comparative Example | 56 | 57 | 58 | 59 | 60 | 61 | 62 |
|---|---|---|---|---|---|---|---|
| Refrigerant | R-407C | | | | | | |
| Compressor | Rotary type | | | | | | |
| Base Oil | Pentaerythritol ester | | | | | | |
| Additives | | | | | | | |
| Anti-oxidant | — | 0.2 | 0.2 | 0.2 | 0.2 | 0.2 | 0.2 |
| Anti-abrasion agent I | — | 0.5 | — | — | 0.5 | 0.5 | — |

TABLE 20-continued

| Comparative Example | 56 | 57 | 58 | 59 | 60 | 61 | 62 |
|---|---|---|---|---|---|---|---|
| Anti-abrasion agent II | — | — | 0.5 | — | 0.5 | — | 0.5 |
| Epoxy compound | — | — | — | 0.2 | — | 0.2 | 0.2 |
| Evaluation (stain) | 15 | 14 | 15 | 12 | 15 | 13 | 16 |

TABLE 21

| Comparative Example | 63 | 64 | 65 | 66 | 67 | 68 | 69 |
|---|---|---|---|---|---|---|---|
| Refrigerant | R-407C | | | | | | |
| Compressor | Rotary type | | | | | | |
| Base Oil | Pentaerythritol ester | | | | | | |
| Additives | | | | | | | |
| Anti-oxidant | 0.2 | 0.2 | 0.2 | 0.2 | 0.2 | 0.2 | 0.2 |
| Anti-abrasion agent I | 1.0 | 0.5 | 0.9 | 1.5 | 0.5 | 1.5 | 1.5 |
| Anti-abrasion agent II | 0.1 | 1.5 | 1.0 | 1.5 | 1.5 | 0.5 | 1.5 |
| Epoxy compound | 0.1 | 0.5 | 2.0 | 0.1 | 2.0 | 2.0 | 2.0 |
| Evaluation (stain) | 11 | 13 | 15 | 17 | 14 | 14 | 18 |

TABLE 22

| | Comparative Example | | |
|---|---|---|---|
| | 70 | 71 | 72 |
| Refrigerant | R-407C | | R-22 |
| Compressor | Rotary type | | |
| Base oil | Pentaerythritol ester | | Alkylbenzene |
| Additives | | | |
| Anti-oxidant | 0.2 | 0.2 | 0.2 |
| Anti-abrasion agent I | 0.005 | 0.5 | 0.5 |
| Anti-abrasion agent II | 0.005 | 0.5 | — |
| Epoxy compound | 0.005 | 0.5 | — |
| Evaluation (stain) | 13 | 12 | 10 |

According to the present invention wherein at least one of HFC-32, HFC-125 and HFC-134a is used as a refrigerant, it is possible to provide a refrigerating machine oil which is excellent in the anti-abrasion property and cleanness in the compressor, and capable of retaining the cleanness for a long period of time particularly in the compressor and obtaining a high reliability.

What is claimed is:

1. A lubricant composition for a refrigerating machine employing a HFC refrigerant containing at least one selected from the group consisting of HFC-32 and HFC-125, which comprises a base oil of an ester formed from a dihydric or higher polyol as an alcohol and a monobasic aliphatic acid, alone or as a mixture thereof; and additives of, based on the total amount, 1) not less than 0.01 vol % and no higher than 0.7 vol % of a phosphate selected from the group consisting of trialkyl phosphates, triaryl phosphates and trioleyl phosphate, 2) from 0.01 to 1.0 vol % of at least one compound selected from the group consisting of an alkylphosphorothionate and an arylphosphorothionate and 3) from 0.01 to 1.0 vol % of an epoxy compound.

2. The lubricant composition according to claim 1, wherein the alcohol is at least one selected from the group consisting of neopentyl glycol, trimethylolpropane, pentaerythritol and dipentaerythritol.

3. The lubricant composition according to claim 1, wherein the monobasic aliphatic acid is at least one selected from the group consisting of propionic acid, isopropionic acid, butanoic acid, isobutanoic acid, pentanoic acid, isopentanoic acid, hexanoic acid, heptanoic acid, isoheptanoic acid, octanoic acid, isooctanoic acid, 2-ethylhexanoic acid, nonanoic acid, isononanoic acid, 3,5,5-trimethylhexanoic acid, decanoic acid, undecanoic acid and lauric acid.

4. The lubricant composition according to claim 1, wherein the phosphate is at least one selected from the group consisting of tributylphosphate, trihexylphosphate, trioctylphosphate, trinonylphosphate, tridecylphosphate, trioleylphosphate, triphenylphosphate, tricresylphosphate, phenyl-diisopropylphenylphosphate and tris(isopropylphenyl)phosphate.

5. The lubricant composition according to claim 1, wherein the at least one of an alkylphosphorothionate and an arylphosphorothionate is at least one selected from the group consisting of trihexylphosphorothionate, triphenylphosphorothionate tris(methylphenyl)phosphorothionate and tris(isobutylphenyl)phosphorothionate.

6. The lubricant composition according to claim 1, wherein the epoxy compound is at least one selected from the group consisting of 1,2-epoxyhexane, 1,2-epoxyheptane, 1,2-epoxyoctane, 1,2-epoxydecane, 1,2-epoxyundecane, 1,2-epoxydodecane, 1,2-epoxytetradecane, 1,2-epoxyhexadecane, 1,2-epoxyheptadecane, 1,2-epoxyoctadecane, vinylcyclohexene dioxide and 1-methyl-4-(2-methyloxiranyl)-7-oxabicyclo[4.1.0]heptane.

7. The lubricant composition according to claim 1, which further comprises at least one selected from the group consisting of an antioxidant, a metal deactivator and a defoaming agent.

8. The lubricant composition according to claim 1, wherein the lubricant composition comprises, based on the total amount, 1) not less than 0.1 vol % and no higher than 0.7 vol % of a phosphate, 2) from 0.1 to 1.0 vol % of at least one of an alkylphosphorothioate and an arylphosphorothionate and 3) from 0.01 to 0.5 vol % of an epoxy compound.

9. The lubricant composition according to claim 1, wherein the lubricant composition comprises, based on the total amount, 1) from 0.1 to no higher than 0.7 vol % of a phosphate, 2) from 0.1 to 0.7 vol % of at least one of an alkylphosphorothioate and an arylphosphorothionate and 3) from 0.1 to 0.5 vol % of an epoxy compound.

* * * * *